July 28, 1959　　　A. A. SYCE　　　2,896,773
CONVEYOR BELT
Filed March 4, 1957
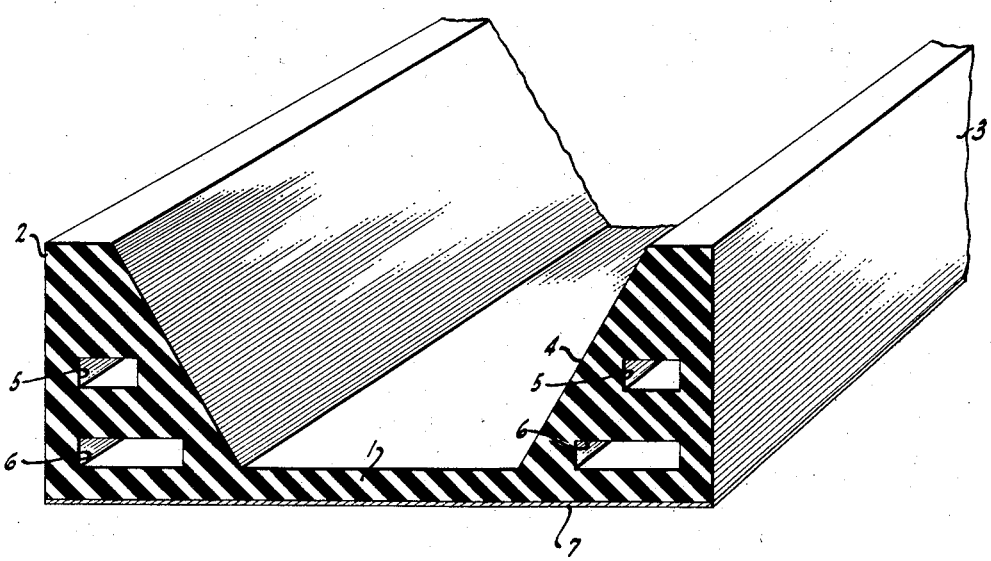
INVENTOR.
ALBERT A. SYCE
BY
ATTORNEYS United States Patent Office 2,896,773
Patented July 28, 1959

2,896,773
CONVEYOR BELT

Albert A. Syce, Oakland, Calif., assignor to Marshall A. Stiltner, Piedmont, Calif.

Application March 4, 1957, Serial No. 643,590

4 Claims. (Cl. 198—201)

This invention relates in general to elastomer conveyor belts.

Although many conveyor belts having upstanding side walls or flanges are currently available, their side walls are invariably vulcanized or otherwise bonded to the base member or flat run. Such belts have proved to be unsatisfactory, for, in passing around a pulley, the tension to which they are subjected progressively increases from their shortest radii to their longest radii. The resulting continual working of the belt in turn results in a gradual disintegration of the belt, and, more particularly, a breakdown of the bond between its side walls and base member. This action is accentuated due to the fact that it is never possible to obtain the component parts of such belts having the same durometer.

More specifically, the object of this invention is the provision of a one piece elastomer belt provided with trapezoidal side walls formed with one or more cavities through their length into which the adjacent elastor can flow and thereby relieve such material of some of the strain to which it would otherwise be subjected.

A further object of this invention is the provision of a conveyor belt of the above character, wherein its cavities are rectangular in cross section and transversely elongated.

Still another object of this invention is the provision of a conveyor belt of the above character, wherein the upper, inner corners of said rectangular cavities lie in a common plane paralleling the inner face of their associated side walls.

The invention possesses other advantageous features, some of which, with the foregoing, will be set forth at length in the following description where that form of the invention which has been selected for illustration in the drawing accompanying and forming a part of the present specification, is outlined in full. In said drawing, one form of the invention is shown, but it is to be understood that it is not limited to such form, since the invention as set forth in the claims may be embodied in other forms.

The single figure of the drawing accompanying and forming a part of this application is a vertical cross section of a conveyor belt embodying the objections of my invention.

The belt shown in this figure comprises resilient elastomer base section 1 of any suitable width and thickness. Merging with the base 1 along either edge thereof is an upstanding wall or flange 2 having a vertical outer face 3 and an inner face 4, preferably inclined at about 30° to the vertical. Formed in each of the side walls 2 is a pair of vertically spaced cavities 5 and 6, generally rectangular in cross section and transversely elongated. The outer walls of each set of cavities preferably lie in a common plane paralleling the outer face of their associated side wall or flange and the upper inner corners of each set of cavities preferably lie on a common plane in parallelism with the inner face of their associated side wall.

Optionally, a liner, backing strip or reinforcing sheet 7 of any desired character may be bonded to and across the lower face of the base member 1.

Although the particular method of forming a belt of this character is not within the scope of this invention, it may be noted that it can be formed as a unitary structure by extrusion into a curing mold or formed directly into such mold. The backing strip (duck or any other desired material) can be applied over the back of the mold prior to the introduction of the elastomer material into the mold and then the assembly can be cured into a belt of any desired length and durometer. Splicing of the free ends of the resulting belt can be effected on a mitering die. The side wall cavities can be held to close tolerance by filler pieces placed therein during the curing operation.

As above stated, the cavities of a belt of this character serve to accommodate portions of the surrounding material while such material is under strain, as when passing over supporting or guide pulleys. The orientation of the cavities is such that the side walls of the belt will substantially retain their unstressed position without tendency to buckle either inwardly or outwardly.

I claim:

1. A one piece elastomer conveyor belt comprising a central bed merging with upstanding side walls, the inner faces of said side walls being upwardly and outwardly inclined and said side walls being provided with a plurality of vertically spaced, transversely elongated, continuous cavities of rectangular cross-section extending therethrough.

2. A conveyor belt of the character defined in claim 1 wherein the said cavities on each side of said walls lie one above the other.

3. A one piece elastomer conveyor belt comprising a central bed merging with upstanding side walls, the inner faces of said side walls being upwardly and outwardly inclined and said side walls being provided with a plurality of vertically spaced, transversely elongated, continuous cavities of rectangular cross-section extending therethrough, and wherein the outer walls of the cavities in each of said side walls lie in a common plane and wherein the upper inner corners of said cavities lie in a common plane paralleling the face of their associated side wall.

4. A conveyor belt of the character defined in claim 3 wherein the outer faces of said side walls are approximately vertical and wherein the inner faces thereof are inclined at approximately 30° with the vertical.

References Cited in the file of this patent

UNITED STATES PATENTS

| | | |
|---|---|---|
| 344,563 | Channell | June 29, 1886 |
| 927,648 | Gates | July 13, 1909 |
| 1,050,991 | Ogle | Jan. 21, 1913 |
| 1,100,406 | Spadone | June 16, 1914 |